Inventors
E. Brown
J. de Freudenreich
By H. R. Kerslake
Atty.

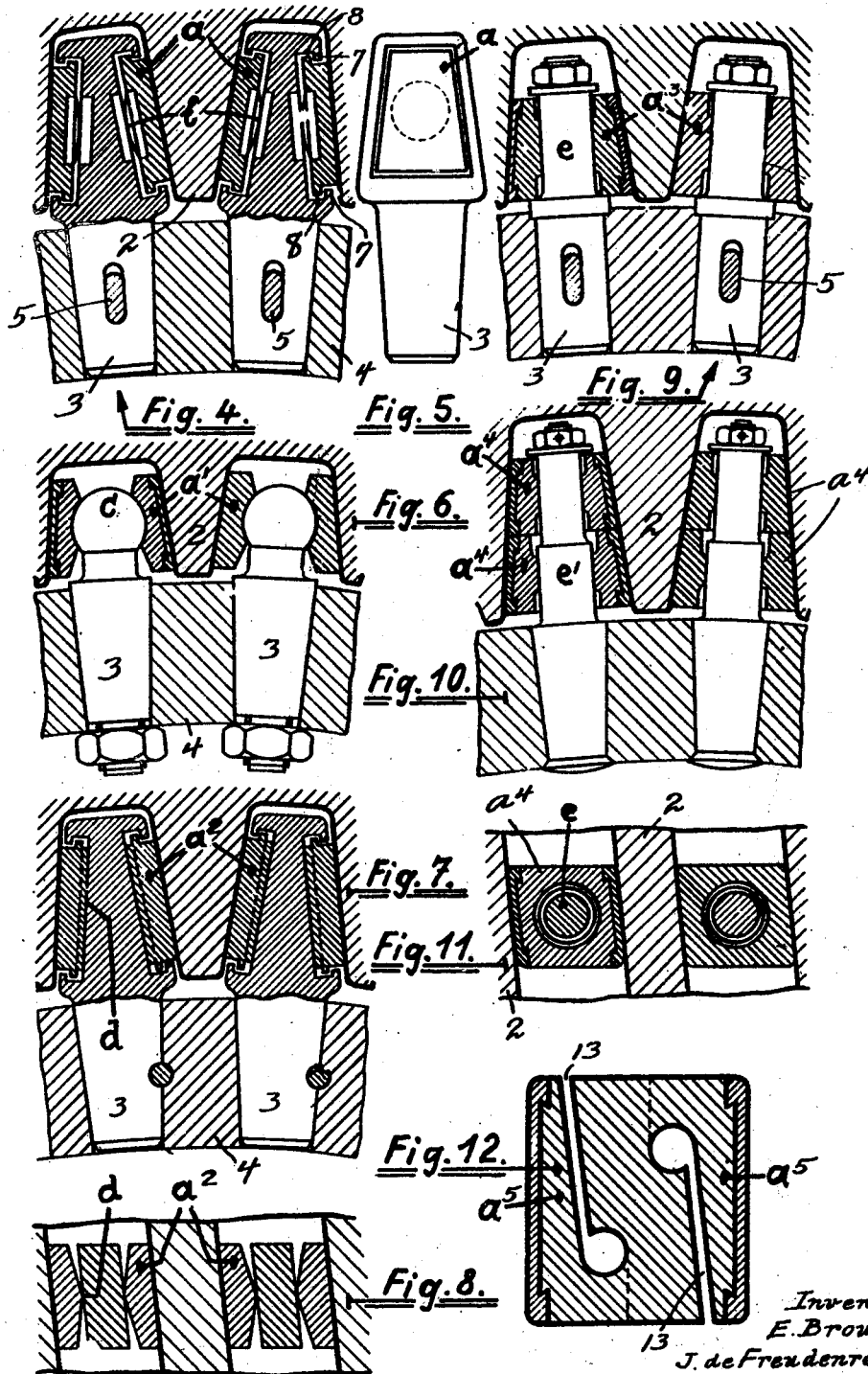

Patented Feb. 3, 1931

1,791,116

UNITED STATES PATENT OFFICE

ERIC BROWN, OF BADEN, AND JEAN DE FREUDENREICH, OF ZURICH, SWITZERLAND, ASSIGNORS TO AKTIENGESELLSCHAFT BROWN BOVERI & CIE., OF BADEN, SWITZERLAND

WORM GEAR

Application filed June 11, 1920, Serial No. 388,308, and in Switzerland June 21, 1919.

This invention relates to worm gearing, and finds particular application to worm gearing in which the worm is of globoid form.

The general object of the invention is to provide a worm gear construction particularly qualified for the transmission of high powers or pressures.

A specific object of the invention is the provision of a worm gear construction particularly qualified for the elimination of friction by virtue of features whereby effective working lubrication is obtained between meshing portions of the driving and driven elements.

Another specific object is the provision of a construction whereby there is attained a distribution of pressures over the coacting surfaces of the meshing parts of the driving and the driven elements, whereby they are qualified to sustain and transmit high power.

Other objects and advantages will be pointed out or indicated hereinafter, or will appear to one skilled in the art upon an understanding of the invention or its employment in practice.

In the accompanying drawings forming a part of this specification, we illustrate various structural forms in which the invention may be embodied, but it is to be understood that these are presented only by way of example, and that the claims are not to be construed as limited to the particular constructions, arrangments or details herein shown and described.

In the drawings,

Fig. 4 is a detail showing in section two worm wheel teeth in mesh with a worm thread, both constructed in accordance with our invention, the section being taken on a radial plane longitudinally of the worm shaft;

Fig. 5 is a detail showing a worm wheel tooth constructed in accordance with our invention, the view being an elevational view of the slot side of the tooth;

Fig. 6 is a detail similar to Fig. 4 but showing a modified construction;

Fig. 7 is a similar sectional detail showing a second modified form of construction;

Fig. 8 is a cross sectional view of the construction shown in Fig. 7;

Fig. 9 is a sectional detail similar to Fig. 4 showing a third modified construction;

Fig. 10 is a similar sectional detail showing a fourth modified construction.

Fig. 11 is a cross section of the construction illustrated in Fig. 10; and

Fig. 12 is a cross sectional detail of a worm wheel tooth of yet another form.

Figure 1:
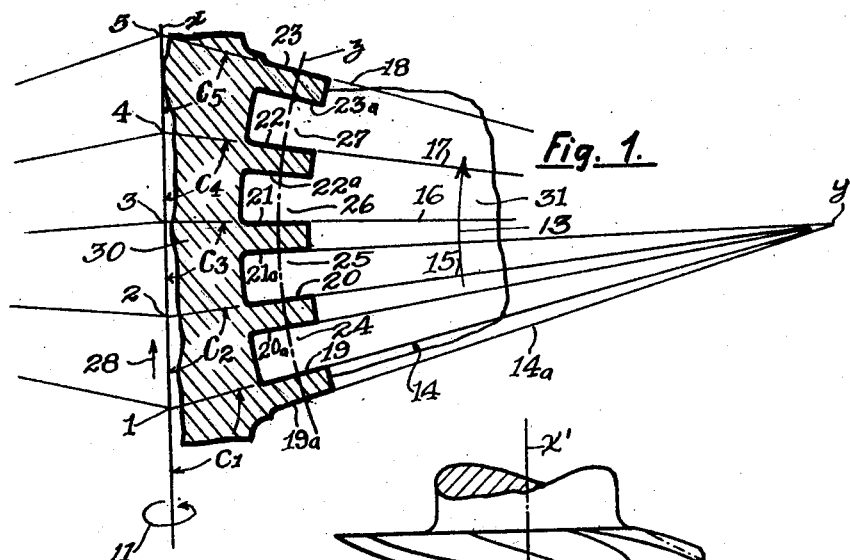
Fig. 1 is a diagrammatic section of a square-threaded worm of globoid form, the section being taken longitudinally of the worm on a radial plane.

Heretofore, in the construction of worm gearing, profiles of the worm and of the wheel teeth have been designed with the idea of minimizing frictional contact by making the contact areas as small as possible and arranging the contacting surfaces in such a manner that their relative motion is in the nature of a rolling cooperation. Their profiles have been designed so that the meeting surfaces will make contact in the nature of a point contact or line contact. Such an arrangement of the meeting surfaces of the meshing elements is disadvantageous, however, where high power is to be transmitted and resulting high pressures are brought to bear upon the contacting surfaces. These disadvantages result from the concentration of high pressures on the limited contact areas which are subjected to friction, and the difficulty of maintaining proper lubrication at the point of contact resulting from the relationship of the coacting surfaces which favors the squeezing out of the oil from between them. While a sliding-surface cooperation occurs in various designs heretofore used, as for example in the case of some designs having a hollow globoid worm, surfaces particularly suited for transmission of high power by a purely sliding cooperation have not, to the best of our knowledge, been provided heretofore, particularly as regards the teeth of the worm wheel, nor have the elements presented surfaces in a relationship conducive to the most effective lubrication.

It is the purpose of this invention to attain these and other advantages through the formation of the worm and the worm wheel teeth in such fashion as to provide for liberal sliding-surface bearing between them in such relationship as to favor or promote the formation of a lubricating layer or film of oil between such bearing surfaces in accordance with the principle explained in the U. S. Patent to Kingsbury No. 947,242 or Osborne Reynolds, "Scientific Papers", vol. 11 pages 228–310; Kueharsky "Zeitschrift fur das gesamte Turbinenwesen" 1916, part 29, page 297, and the same publication parts 20—26, page 205. The nature of the invention will be ascertained from a consideration of the illustrative forms shown in the drawing.

In the construction illustrated in Fig. 4, the reference character 2 designates the worm, and the numeral 4 the worm wheel. The wheel teeth are separately formed elements having their studs or stems 3 set into the wheel in the proper radial disposal and distribution and held by the keys 5. While the supporting stems or studs of the respective teeth are fixed in the worm wheel, the portions which are adapted for bearing engagement with the worm are formed as individually movable shoes or bearing members $a$ which are suitably maintained in proper position on the supporting studs by means of the overlapping shoulders 7 and 8. These shoulders allow the bearing members $a$ a limited shifting movement on the supporting studs, and also a limited rocking movement which is afforded by supporting the bearing members $a$ on elements $b$ presenting a spherical surface for contact with the tooth studs. A similar adjustability of the bearing members $a'$, in the construction illustrated in Fig. 6, is attained by supporting them eccentrically on the spherical heads $c$ of the tooth studs 3.

Figure 2:
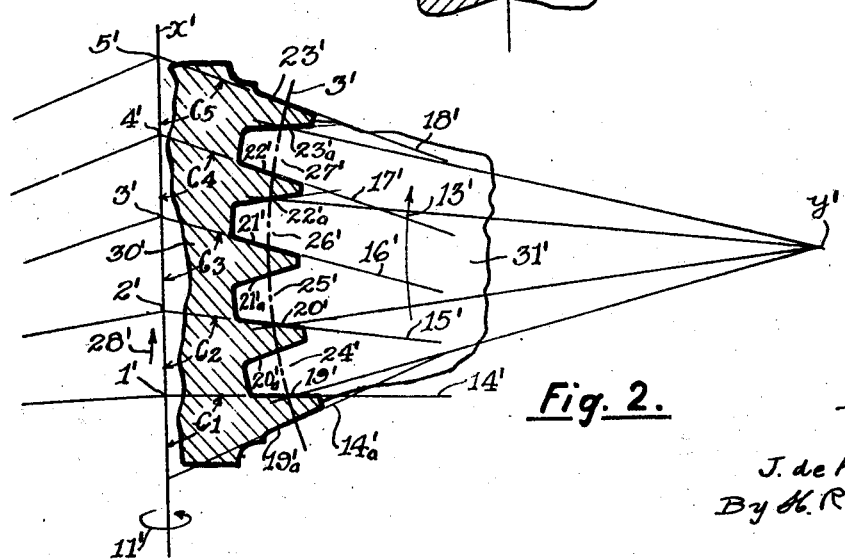
Fig. 2 is a similar section of a globoid worm having the thread formed in accordance with our invention.

A sectional form of the improved worm is illustrated in Fig. 2, from which an understanding of its distinguishing features may be had by comparison with the form illustrated in Fig. 1. Taking the latter as illustrative of a section of a worm of globoid form, such as has been constructed heretofore, it will first be assumed that the worm 30 is rotating about its longitudinal axis $x$ in the direction indicated by the arrow 11, and is driving the cooperating worm wheel 31 in the direction indicated by the arrow 13. The construction lines 14, 15, 16, 17 and 18 lie in the plane perpendicular to the axis of rotation $y$ of the worm wheel and within which lie the worm axis $x$ and the pitch line $z$, the lines 14–18 passing respectively through the bearing or power-transmitting surfaces 19, 20, 21, 22 and 23 engaging, respectively, the tooth portions or teeth 24, 25, 26, 27, etc., of the worm wheel. These lines, furthermore, constitute elements of cones having their respective apexes situated on axis $x$ at the points 1, 2, 3, 4 and 5 and their respective altitudes each coextensive with axis $x$. The cones 1—14 and 2—15 are oppositely directed with respect to the cones 3—16, 4—17 and 5—18, this being due to the method of development. It will therefore be seen that the worm presents the undesirable concave power-transmitting surface 19—20 to the respective tooth portions or teeth 24 and 25 of the worm wheel, and presents the more desirable convex power-transmitting surface 21—23 to the respective adjacent tooth portions or teeth 26, 27, etc., of the worm wheel. Similarly, it will be seen that the bearing surfaces $19_a$ and $20_a$ are convex with respect to the respective adjacent teeth of the worm wheel, while the bearing surfaces $21_a$, $22_a$ and $23_a$ are concave with respect to the respective adjacent teeth of the worm wheel, these being power-transmitting surfaces when the driving worm rotates in the direction opposite to that indicated by arrow 11. In the prior construction of Fig. 1, therefore, the relationship between the pressure or power-transmitting surface of the worm to the cooperating teeth of the worm wheel is convex through only a portion of the effective length of the worm, such surface being concave throughout the remainder of such portion, this being true regardless of the direction of rotation of the worm.

In Fig. 1 the power-transmitting surface 19—23 is generated by a line having, for example, the initial position of line 14 and being simultaneously given three distinct uniform movements. The first movement is a rotary one about the axis $x$ of the worm and in the direction opposite to that indicated by arrow 11. The second movement is one longitudinally of the worm axis $x$ and in the direction of the arrow 28. The third movement is an angular one where the angular relation of the generating line with respect to the worm axis is first obtuse and then acute. In the latter connection, it will be seen that when the generating line is in the positions of lines 14 and 15 the respective angles $C_1$ and $C_2$ are obtuse, angle $C_2$ being less than angle $C_1$, and that when such line is in the positions of lines 16, 17 and 18 the respective angles $C_3$, $C_4$ and $C_5$ are acute, angle $C_4$ being less than angle $C_3$ and angle $C_5$ being less than angle $C_4$. The generating line, therefore, can be said to pass, in its angular movement, through the ninety degree position with respect to the worm axis, being first obtusely and then acutely related thereto. The opposite bearing surface $19_a$—$23_a$ is generated in a similar manner by a second line having, for example, the initial position of line $14_a$ and which is simultaneously given the same three distinct uniform movements as line 14.

Figure 3:
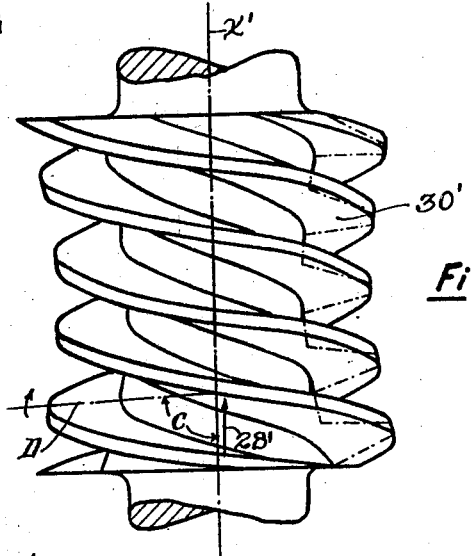
Fig. 3 is an elevational view of a globoid worm formed in accordance with our invention.

Coming now to consideration of the improved worm gear construction shown in Figs. 2 and 3, it will be shown that in the same the relationship between the pressure or power-transmitting surface of the worm is convex throughout the entire portion of the effective length of the worm, this being true regardless of the direction of rotation of the same. In Fig. 2 it is assumed that the worm 30' is rotating about its longitudinal axis $x'$ in the direction indicated by the arrow 11', and is driving the cooperating worm wheel 31' in the direction indicated by the arrow 13'. The construction lines 14', 15', 16', 17' and 18', similar to the corresponding lines in Fig. 1, lie in the plane perpendicular to the axis of rotation $y'$ of the worm wheel and within which lie the worm axis $x'$ and the pitch line $z'$, the lines 14'—18' passing respectively through the bearing or power-transmitting surfaces 19', 20', 21', 22' and 23' engaging respectively the tooth portions or teeth 24', 25', 26', 27', etc., of the worm wheel. These lines, as in Fig. 1, constitute elements of cones having their respective apexes situated on axis $x'$ at the points 1', 2', 3', 4' and 5' and their respective altitudes each coextensive with axis $x'$. In contradistinction from Fig. 1, it will be seen that due to the method of development in Fig. 2, the cones 1'—14', 2'—15', 3'—16', 4'—17' and 5'—18' are all similarly directed with respect to each other. It will therefore be seen that in the improved construction the entire power-transmitting surface 19'—23' of the worm is convex with respect to the respective tooth portions or teeth 24', 25', 26', 27', etc. Similarly, it will be seen that the entire opposite bearing surface 19'$_a$—23'$_a$ of the worm is convex with respect to such teeth of the worm wheel, this surface being power-transmitting when the worm rotates in the direction opposite to that indicated by arrow 11'. At all points, therefore, the improved worm 30' presents a convex power-transmitting surface to each tooth of the worm wheel, this being true regardless of the direction of rotation of the same.

In Figs. 2 and 3 the power-transmitting surface 19'—23' is generated by a line such as D in Fig. 3, having, for example, the initial position of line 14' and being simultaneously given three distinct uniform movements. The first movement is a rotary one about the axis $x'$ of the worm and in the direction opposite to that indicated by arrow 11'. The second movement is one longitudinally of the worm axis $x'$ in the direction of the arrow 28'. The third movement is an angular one wherein the angular relation of the generating line D with respect to the worm axis is always acute, such relation varying from ninety or a less number of degrees toward zero degrees. In the latter connection, it will be seen that, in any of its generating positions, such as the positions of lines 14', 15', 16', 17' and 18', the respective angles $c_1$, $c_2$, $c_3$, $c_4$ and $c_5$ are each acute, angle $c_2$ being less than $c_1$, angle $c_3$ being less than $c_2$, and so on. The generating line, therefore, can be said to be always acutely related to axis $x'$, and to at no time pass through the ninety degree position with respect to axis $x'$, although the initial or starting position of line D might be at the ninety degree relation. In the claims, where mention is made of a variation between ninety degrees and zero degrees, or of an acute relation, the same might include the ninety degree position, a ninety degree or right angle being understood to be a special acute angle, that is, the angle which such relation can approach as a limit and still be acute. The opposite bearing surface 19'$_a$—23'$_a$ is generated in a similar manner by a second line having, for example, the initial position of line 14'$_a$ and which is simultaneously given the same three distinct uniform movements as line D. So long as the pressure or power-transmitting surface of the worm meets the coacting surface of the wheel tooth in a convex relationship, the conditions exist which favor the formation of an intervening oil film which diminishes in section in the direction of movement, thereby effecting the condition which enables the transmission of high pressures between sliding surfaces through proper lubrication. However, when the relationship of the coacting surfaces becomes concave, then the conditions are not presented for the successful formation of the lubricating film, since the wheel tooth could not assume such an inclined position to the surface of the worm as to produce the desired diminishing cross section for the oil film in the direction of movement. Accordingly, we give the worm such a form that its surface does not assume a concave relationship with respect to the wheel tooth even in the extreme position at the end of the worm.

In the modification of the tooth structure illustrated in Fig. 7, the bearing members $a^2$ are supported on a knife edge or ridge $d$ extending longitudinally of the tooth, the same being slightly off the median line of the bearing member. This is illustrated in the cross section shown in Fig. 8. In the modification illustrated in Fig. 9 the bearing members $a^3$ have shiftable mounting on the cylindrical portions $e$ of the tooth stud, whereby the bearing surfaces of the members $a^3$ may change their angularity with respect to the coacting surface of the worm. A similar arrangement is illustrated in Fig. 10, modified to the extent that the bearing members are subdivided into sections $a^4$. A cross section of this modification is shown in Fig. 11, which will also serve as a cross sectional illustration of the form shown in Fig. 9, and shows the rounded form of the edges of the bearing member on the side at which the worm enters. In the form illustrated in Fig. 12, which represents a cross section of a single tooth, the bearing members $a^5$ are formed from a part of the metal in the tooth by the provision of slots 13 which allow the bearing members a certain amount of flexing movement so that their bearing surfaces may be accommodated to different angular positions with respect to the surface of the worm. The bearing surfaces of the bearing members may be suitably hardened, or may be provided with hardened inserts or overlays, as illustrated in Figs. 6, 9, 10, 11 and 12. It will be observed that a characterizing feature of the invention is the provision of means whereby the relationship of the coacting surfaces of the worm and the wheel teeth may vary in angularity in the direction of movement of the worm. Besides providing the conditions which make for the creation and maintenance of the lubricating film between the coacting surfaces, this feature permits also some equalization of the load among different teeth in mesh with the worm.

What we claim is:

1. In worm gearing, the combination of a worm, a worm wheel having tooth portions, and subdivided bearing members pivotally mounted on said tooth portions and presenting surfaces for sliding coaction with the worm.

2. In worm gearing, in combination, a worm wheel, bearing members carried by the worm wheel and having rocking movement thereon in a direction transversely of the wheel, said bearing members presenting bearing surfaces, and a helical worm of globoid form having a pitched surface arranged for sliding coaction with said bearing surfaces, said pitched surface being so shaped that no portion thereof assumes a concave relationship to said bearing surfaces in the direction of movement throughout the meshing co-operation of the gear and bearing members.

3. In worm gearing, in combination, a worm wheel having tooth portions carrying movable bearing members mounted to permit variation of their angular positions in the transverse direction of the tooth portions, a helical worm of globoid form for meshing co-operation with said bearing members, said bearing members and said worm presenting surfaces for sliding coaction during their meshing engagement, the power-transmitting bearing surface of the worm being convex with respect to each of the respective bearing members they engage.

4. In worm gearing, a worm, a cooperating worm wheel provided with teeth, members oscillatably mounted on said teeth and presenting surfaces having sliding coaction with the power-transmitting meshing surface of the worm, such meshing surface being convex with respect to the coacting surfaces of said members throughout its entire length.

In testimony whereof we have signed our names to this specification.

ERIC BROWN.
Dr. JEAN de FREUDENREICH.